US008074332B2

(12) United States Patent
Keatch et al.

(10) Patent No.: US 8,074,332 B2
(45) Date of Patent: Dec. 13, 2011

(54) METHOD FOR REMOVING OILFIELD MINERAL SCALE FROM PIPES AND TUBING

(75) Inventors: Richard W. Keatch, Aberdeenshire (GB); Simon K. Ray, Edinburgh (GB)

(73) Assignees: M-I Production Chemicals UK Limited, Aberdeen (GB); Oilfield Mineral Solutions Limited, Scotland (GB)

( * ) Notice: Subject to any disclaimer, the term of this patent is extended or adjusted under 35 U.S.C. 154(b) by 1174 days.

(21) Appl. No.: 11/828,163

(22) Filed: Jul. 25, 2007

(65) Prior Publication Data

US 2008/0023202 A1 Jan. 31, 2008

Related U.S. Application Data

(60) Provisional application No. 60/820,861, filed on Jul. 31, 2006.

(51) Int. Cl.

| | |
|---|---|
| ***B21B 45/04*** | (2006.01) |
| ***E21B 43/11*** | (2006.01) |
| ***E21B 29/00*** | (2006.01) |
| ***F16L 55/18*** | (2006.01) |

(52) U.S. Cl. .................. 29/81.021; 29/81.01; 29/81.02; 166/311; 166/376; 166/377; 405/184.3

(58) Field of Classification Search ................. 29/81.01, 29/81.02, 81.021, 403.3; 166/55.2, 55.6, 166/55.7, 311, 376, 377; 405/184.3
See application file for complete search history.

(56) References Cited

U.S. PATENT DOCUMENTS

| | | | | |
|---|---|---|---|---|
| 4,628,894 | A * | 12/1986 | Stewart | 125/21 |
| 4,957,022 | A * | 9/1990 | Harris | 83/16 |
| 5,197,173 | A * | 3/1993 | Stokes et al. | 29/81.021 |
| 6,340,270 | B2 * | 1/2002 | Puttmann | 405/184.3 |
| 7,093,653 | B2 * | 8/2006 | Metcalfe et al. | 166/230 |

FOREIGN PATENT DOCUMENTS

| | | |
|---|---|---|
| GB | 2087303 A | 5/1982 |
| JP | 61089500 | 5/1986 |
| JP | 16042002 | 2/2004 |
| KR | 10-2002-0090170 | 11/2002 |

OTHER PUBLICATIONS

Examination Report issued in related Australian Patent Application No. 2007281282; Dated May 10, 2010 (2 pages).
English Patent Abstract of JP16-042002 from Industrial Property Digital Library (IPDL), published Feb. 12, 2004, 2 pages.
English Patent Abstract of JP61-089500 from esp@cenet, published May 7, 1986, 1 page.
PCT International Search Report issued in PCT Application No. PCT/US2007/074617 dated Dec. 26, 2007 (4 pages).
PCT Written Opinion issued in PCT Application No. PCT/US2007/074617 dated Dec. 26, 2007 (8 pages).
Office Action in Canadian Patent Application No. 2,658,485 dated Jan. 14, 2011 (3 pages).

* cited by examiner

*Primary Examiner* — David Bryant
*Assistant Examiner* — Alexander P Taousakis
(74) *Attorney, Agent, or Firm* — Osha • Liang LLP

(57) ABSTRACT

A method for removing mineral scale from tubing is disclosed. The method may include the steps of making a first longitudinal cut along a length of the tubing, making a second longitudinal cut along a length of tubing, and removing a plurality of sections of tubing, wherein the sections of tubing are defined by the first and second longitudinal cuts.

15 Claims, 5 Drawing Sheets

METHOD FOR REMOVING OILFIELD MINERAL SCALE FROM PIPES AND TUBING

CROSS-REFERENCE TO RELATED APPLICATIONS

This application, pursuant to 35 U.S.C. §119(e), claims priority to U.S. Provisional Application Ser. No. 60/820,861, filed Jul. 31, 2006. That application is incorporated by reference in its entirety.

BACKGROUND OF INVENTION

1. Field of the Invention

The invention relates generally to pipes and tubing used in the oilfield. Specifically, the invention relates to an improved method for removing mineral scale from pipes and tubing.

2. Background Art

Hydrocarbons (e.g., oil, natural gas, etc.) are obtained from a subterranean geologic formation (i.e., a "reservoir") by drilling a wellbore that penetrates the hydrocarbon-bearing formation. In order for the hydrocarbons to be produced, that is, travel from the formation to the wellbore, and ultimately to the surface, at rates of flow sufficient to justify their recovery, a sufficiently unimpeded flowpath from the subterranean formation to the wellbore, and then to the surface, must exist or be provided.

Subterranean oil recovery operations may involve the injection of an aqueous solution into the oil formation to help move the oil through the formation and to maintain the pressure in the reservoir as fluids are being removed. The injected aqueous solution, usually surface water (lake or river) or seawater (for operations offshore), generally contains soluble salts such as sulfates and carbonates. These salts may be incompatible with the ions already contained in the oil-containing reservoir. The reservoir fluids may contain high concentrations of certain ions that are encountered at much lower levels in normal surface water, such as strontium, barium, zinc and calcium. Partially soluble inorganic salts, such as barium sulfate (or barite) and calcium carbonate, often precipitate from the production water as conditions affecting solubility, such as temperature and pressure, change within the producing well bores and topsides.

A common reason for a decline in hydrocarbon production is the formation of scale in or on the wellbore, in the near-wellbore area or region of the hydrocarbon-bearing formation matrix, and in other pipes or tubing. Oilfield operations often result in the production of fluid containing saline-waters as well as hydrocarbons. The fluid is transported from the reservoir via pipes and tubing to a separation facility, where the saline-waters are separated from the valuable hydrocarbon liquids and gasses. The saline-waters are then processed and discharged as waste water or re-injected into the reservoir to help maintain reservoir pressure. The saline-waters are often rich in mineral ions such as calcium, barium, strontium and iron anions and bicarbonate, carbonate and sulphate cations. Generally, scale formation occurs from the precipitation of minerals, such as barium sulfate, calcium sulfate, and calcium carbonate, which become affixed to or lodged in the pipe or tubing. When the water (and hence the dissolved minerals) contacts the pipe or tubing wall, the dissolved minerals may begin to precipitate, forming scale. These mineral scales may adhere to pipe walls as layers that reduce the inner bore of the pipe, thereby causing flow restrictions. Not uncommonly, scale may form to such an extent that it may completely choke off a pipe. Oilfield production operations may be compromised by such mineral scale. Therefore, pipes and tubing may be cleaned or replaced to restore production efficiency.

Some mineral scales, such as barium sulphate, are very difficult to remove chemically, from tubing and, as such, the tubing is simply replaced with new tubing. The scaled tubing may be removed for disposal, but the mineral scale that forms presents an environmental hazard. For example, some mineral scales may have the potential to contain naturally occurring radioactive material (NORM). The scale has an associated radioactivity because the radioactive decay daughters of Uranium and Thorium are naturally present in reservoir waters and co-precipitate with barium ions to form a barium sulphate scale that, for example, contains Radium-226 Sulphate. The primary radionuclides contaminating oilfield equipment include Radium-226 ($^{226}$Ra) and Radium-228 ($^{228}$Ra), which are formed from the radioactive decay of Uranium-238 ($^{233}$U) and Thorium-232 ($^{232}$Th). While $^{238}$U and $^{232}$Th are found in many underground formations, they are not very soluble in the reservoir fluid. However, the daughter products, $^{226}$Ra and $^{228}$Ra, are soluble and can migrate as ions into the reservoir fluids to eventually contact the injected water. While these radionuclides do not precipitate directly, they are generally co-precipitated in barium sulfate scale, causing the scale to be mildly radioactive. This NORM poses a hazard to people coming into contact with it through irradiation and through breathing or ingestion of NORM particles. As a result, the NORM scaled tubing has to be handled, transported, and disposed of under carefully controlled conditions, as outlined in legislation, to protect the welfare of employees, the public at large, and the environment.

Common operations used for removing scale from tubing may be slow and inefficient because each tube has to be individually treated if they are radioactive and access to the scaled internal surface of the tubing may be restricted.

When pipes and equipment used in oilfield operations become layered with scale, the encrustation must be removed in a time- and cost-efficient manner. Occasionally, contaminated tubing and equipment is simply removed and replaced with new equipment. When the old equipment is contaminated with NORM, this scale encrusted equipment may not be disposed of easily because of the radioactive nature of the waste. The dissolution of NORM scale and its disposal may be costly and hazardous. In addition, a considerable amount of oilfield tubular goods and other equipment awaiting decontamination is presently sitting in storage facilities. Some equipment, once cleaned, may be reused, while other equipment must be disposed of as scrap. Once removed from the equipment, several options for the disposal of NORM exist, including deep well injection, landfill disposal, and salt cavern injection.

Typical equipment decontamination processes have included both chemical and mechanical efforts, such as milling, high pressure water jetting, sand blasting, cryogenic immersion, and chemical chelants and solvents. Water jetting using pressures in excess of 140 MPa (with and without abrasives) has been the predominant technique used for NORM removal. However, use of high pressure water jetting is generally time consuming, expensive, and may fail to thoroughly treat the contaminated area.

While chemical chelants, such as EDTA (ethylenediaminetctraacetic acid) or DTPA (diethylenetriaminepentaacetic acid), have long been used to remove scale from oilfield equipment, once EDTA becomes saturated with scale metal cations, the spent solvent is generally disposed of, such as by re-injection into the subsurface formation. Further, chemical chelants such as EDTA and DTPA are expensive and require prolonged contact at elevated temperatures to dissolve the scale.

Accordingly, there exists a need for an economically efficient means for removing scale from pipes and tubing with a low risk of exposure to radioactive materials.

SUMMARY OF INVENTION

In one aspect, embodiments disclosed herein relate to a method for removing mineral scale from tubing, the method including making a first longitudinal cut along a length of the tubing, making a second longitudinal cut along a length of tubing, removing a plurality of sections of tubing, wherein the sections of tubing are defined by the first and second longitudinal cuts.

In another aspect, embodiments disclosed herein relate to a method for removing mineral scale from tubing, the method including making a first longitudinal cut tangential to an inside diameter of the tubing, making a second longitudinal cut tangential to the inside diameter of the tubing, and removing a plurality of sections of tubing, wherein the sections of tubing are defined by the first and second longitudinal cuts.

In another aspect, embodiments disclosed herein relate to a method for removing mineral scale from tubing, the method including making at least one cut longitudinally along the tubing and separating cut tubing from the mineral scale.

Other aspects and advantages of the invention will be apparent from the following description and the appended claims.

DETAILED DESCRIPTION

In one aspect, embodiments of disclosed herein relate to a method of removing mineral scale from oilfield pipes and tubing. In particular, embodiments disclosed herein relate to a method of mechanically separating mineral scale from oilfield pipes and tubing. Further, as used herein, "pipes," "tubing," and "tubes" may be used interchangeably to describe embodiments without limiting the scope of the claims.

Mineral scale that may be removed from oilfield equipment in embodiments disclosed herein includes oilfield scales, such as, for example, salts of alkaline earth metals or other divalent metals, including sulfates of barium, strontium, radium, and calcium, carbonates of calcium, magnesium, and iron, metal sulfides, iron oxide, and magnesium hydroxide.

Figure 1:
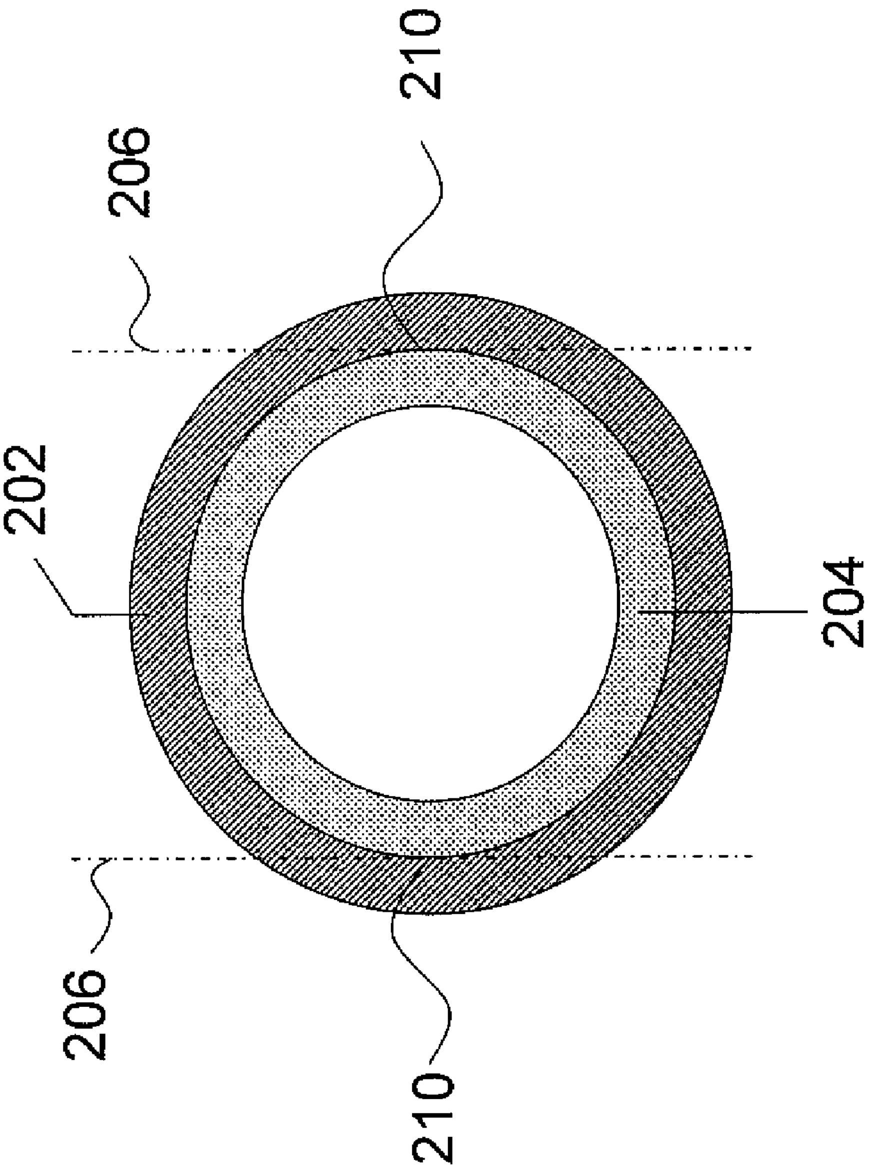
FIG. 1 is a cross-sectional view of a pipe encrusted with mineral scale, in accordance with embodiments disclosed herein.

A method of removing or separating mineral scale from a tubular or pipe according to an embodiment disclose herein is shown in FIGS. 1-4. As shown in FIG. 1, a pipe 202 is encrusted with a layer of mineral scale 204. In this embodiment, mineral scale layer 204 is a uniform layer formed on an inside diameter of pipe 202. However, one of ordinary skill in the art will appreciate that the layer of mineral scale may or may not be uniform along a length and/or circumference of the pipe. In one embodiment, at least one longitudinal cut is made along the pipe 202. As used herein, "longitudinal" describes a direction along the length of the pipe 202. In another embodiment, two longitudinal cuts are made along the pipe. One of ordinary skill in the art will appreciate that any number of longitudinal cuts may be made without departing from the scope of the invention.

In the embodiment shown in FIG. 1, two longitudinal cuts 206 are made in pipe 202. Longitudinal cuts 206 may be made so that each longitudinal cut 206 is substantially tangential to an inside diameter of pipe 202. Accordingly, longitudinal cuts 206 are tangential to an interface 210 between mineral scale layer 204 and pipe 202. In one embodiment, two longitudinal cuts 206 are substantially parallel.

Figure 3:
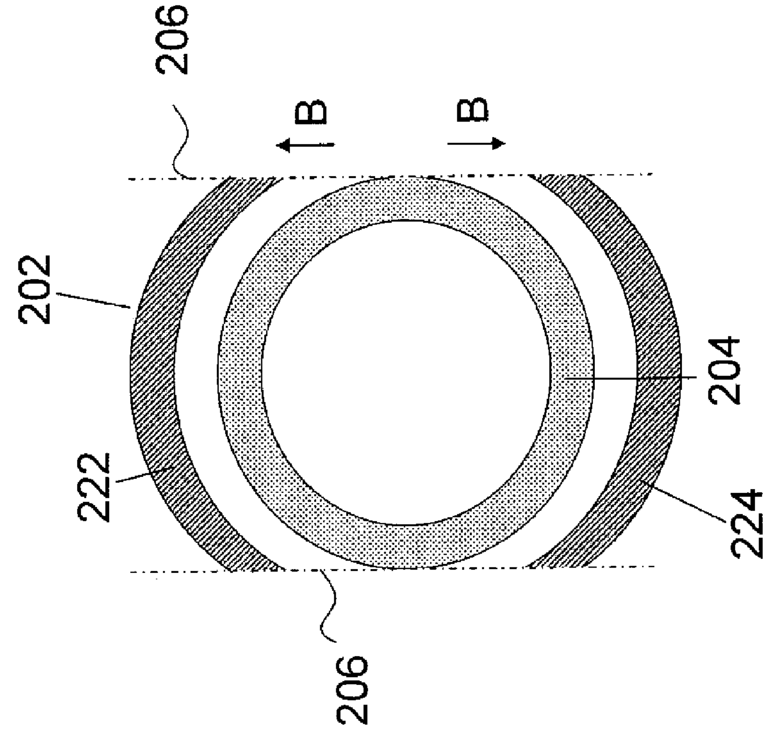
FIG. 3 is a cross-sectional view of a pipe and mineral scale, in accordance with embodiments disclosed herein.
Figure 2:
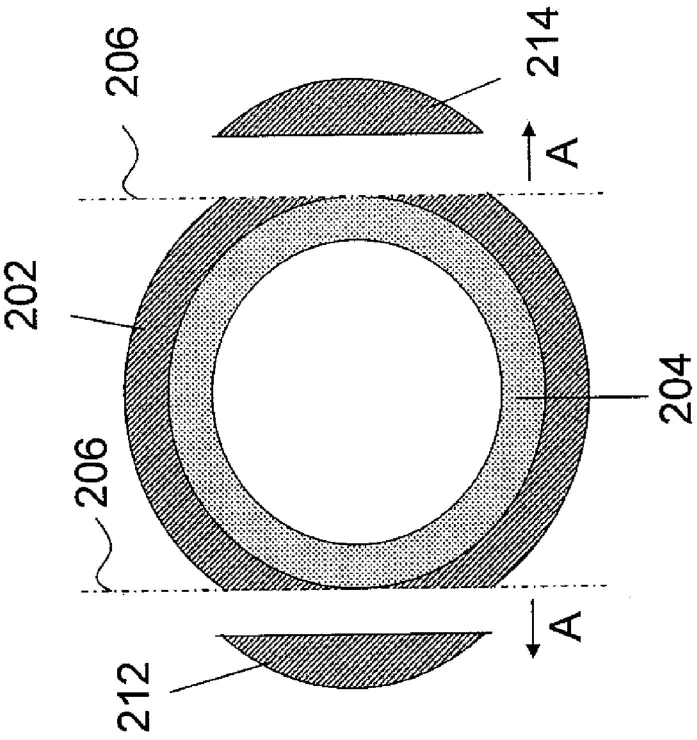
FIG. 2 is a cross-sectional view of a pipe encrusted with mineral scale, in accordance with embodiments disclosed herein.

Referring now to FIG. 2, after longitudinal cuts 206 are made, a first cut portion 212 and a second cut portion 214 of pipe 202 may be moved away, as indicated at A, from mineral scale layer 204. As shown in FIG. 3, after removal of first and second cut portions 212, 214, a first side 222 and a second side 224 of pipe 202 may be removed, as indicated at B, from mineral scale layer 204. Accordingly, as shown in FIGS. 1-3, longitudinal cuts 206 made substantially tangential to interface 210 between pipe 202 and mineral scale layer 204 allow removal of pipe 202 from mineral scale layer 204.

Figure 4:
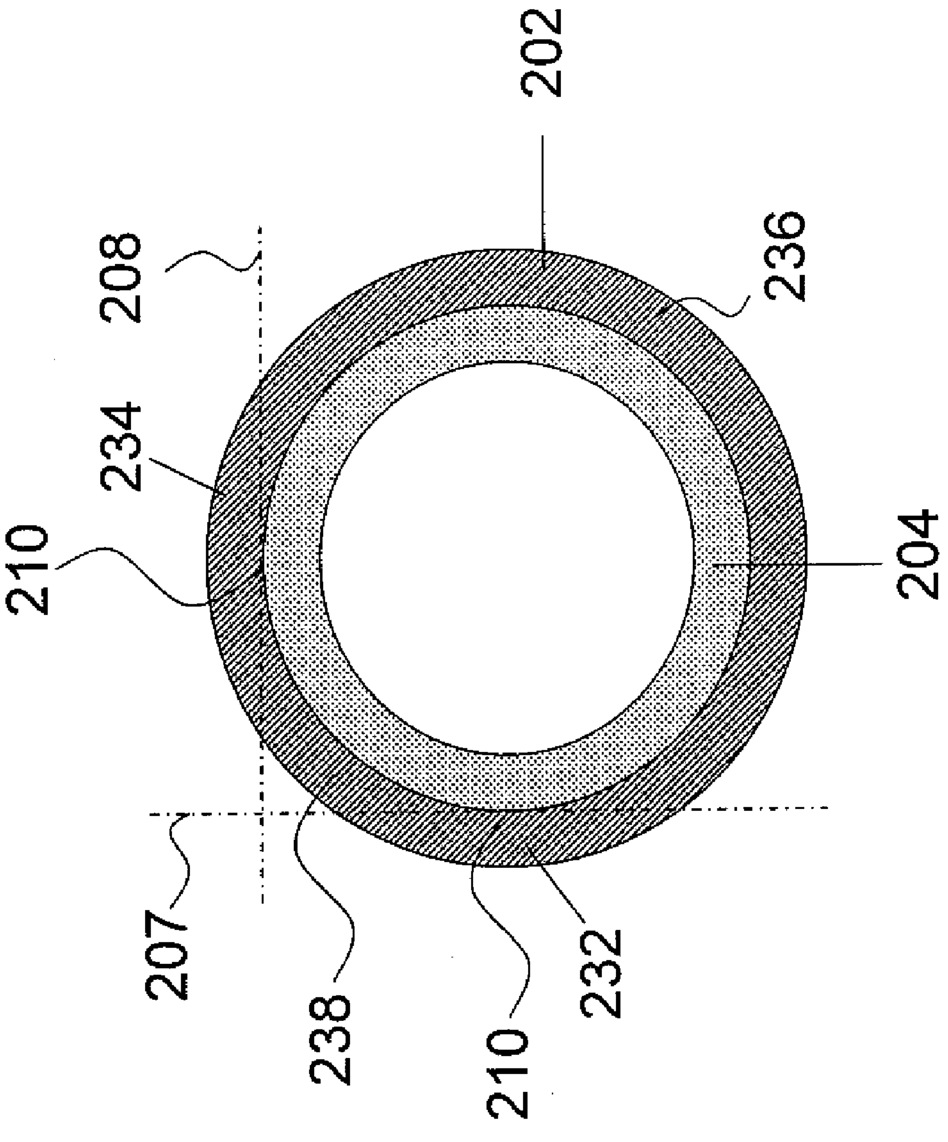
FIG. 4 is a cross-sectional view of a pipe encrusted with mineral scale, in accordance with embodiments disclosed herein.

FIG. 4 shows another embodiment of a method for separating scale from a pipe or tubular. In this embodiment, two longitudinal cuts 407, 408 are made in pipe 402. Longitudinal cuts 407, 408 may be made so that each longitudinal cut 407, 408 is substantially tangential to an inside diameter of pipe 402. Accordingly, the longitudinal cuts 407, 408 are tangential to an interface 410 between mineral scale layer 404 and pipe 402. In this embodiment, first longitudinal cut 407 is substantially perpendicular to second longitudinal cut 408. In this embodiment, after the two longitudinal cuts 407, 408 are made, a first cut portion 432 and a second cut portion 434 of pipe 402 may be removed. A small section 438 and a large section 436 of pipe 402 may then be removed from mineral scale layer 404.

Figure 5:
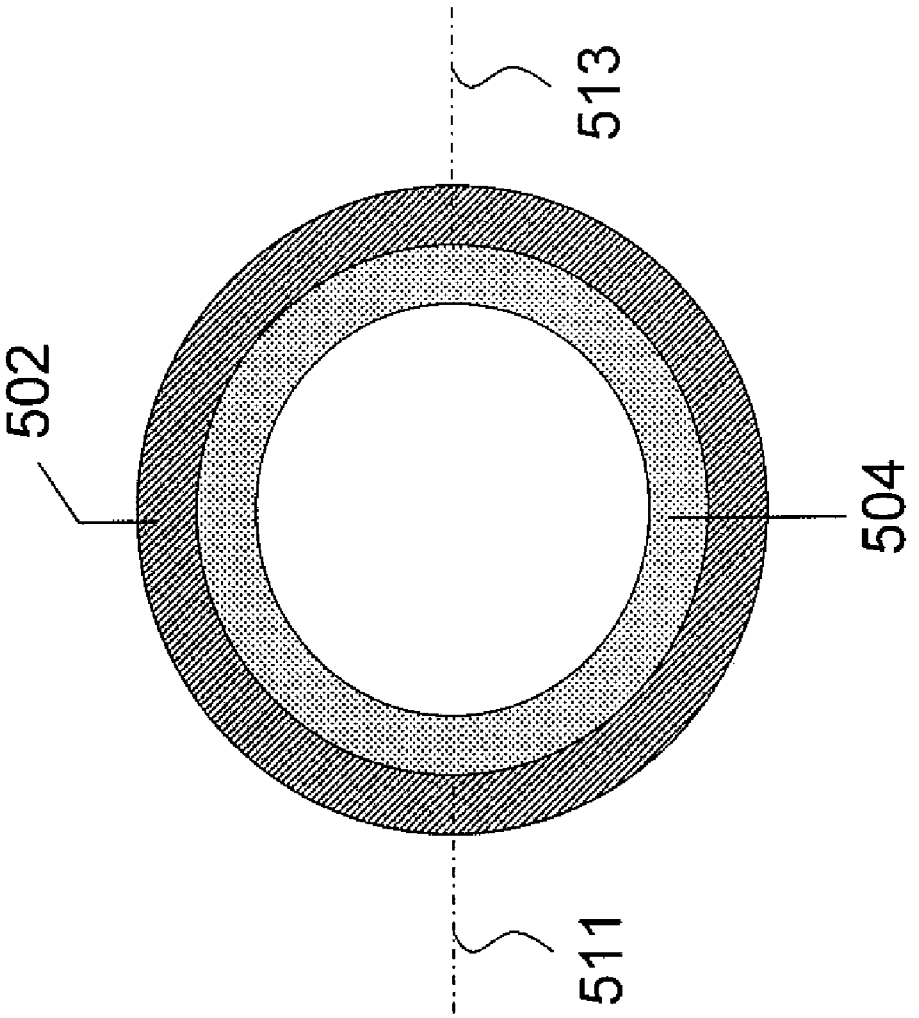
FIG. 5 is a cross-sectional view of a pipe encrusted with mineral scale, in accordance with embodiments disclosed herein.
Figure 6:
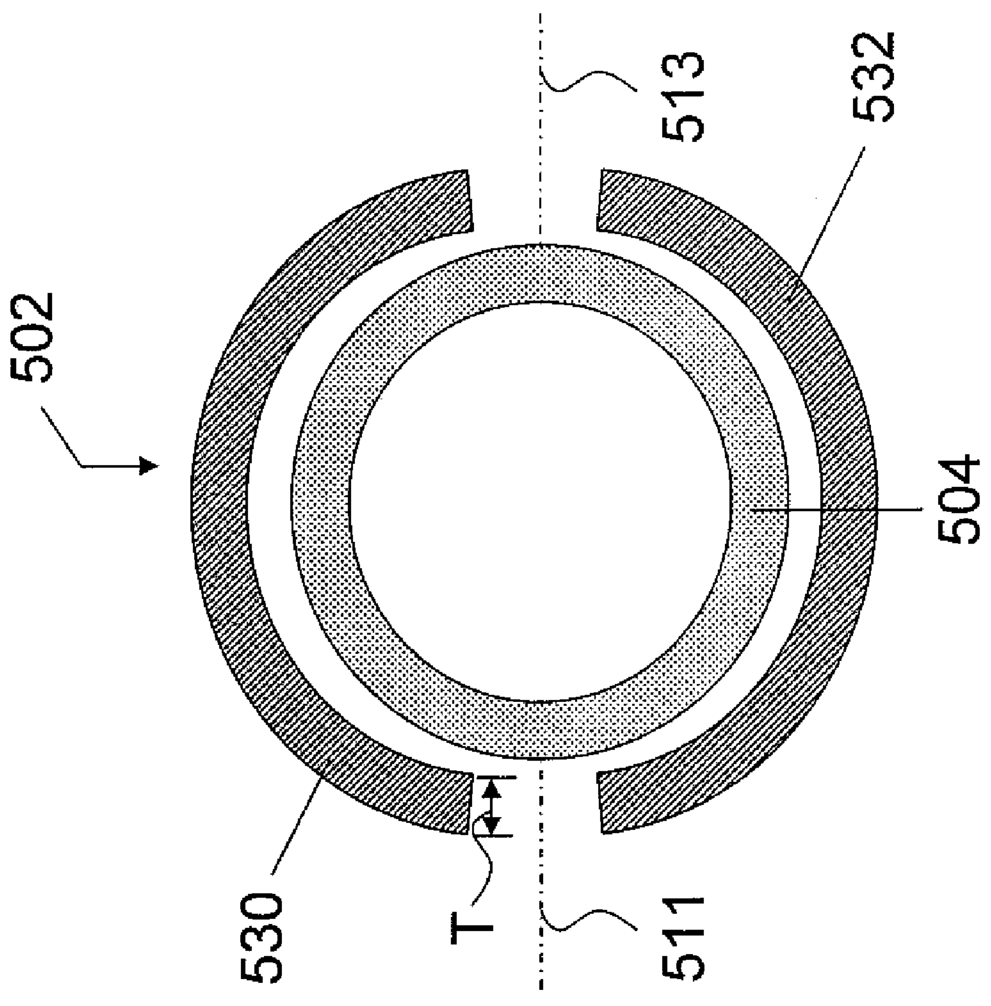
FIG. 6 is a cross-sectional view of a pipe encrusted with mineral scale, in accordance with embodiments disclosed herein.

FIGS. 5 and 6 show another embodiment of a method for separating scale from a pipe or tubular. In this embodiment, two longitudinal cuts 511, 513 are made in a pipe 502. Longitudinal cuts 511, 513 may be made so that each longitudinal cut 511, 513 is substantially perpendicular to an outside surface of pipe 502. The depth of each longitudinal cut 511, 513 is limited to about a thickness T of pipe 502, thereby not substantially cutting into mineral scale layer 504. In this embodiment, after the two longitudinal cuts 511, 513 are made, a first half 530 and a second half 532 of pipe 502 may be removed from mineral scale layer 504.

Longitudinal cuts 206 (FIG. 1), 407, 408 (FIG. 4) through a pipe may be made by any method known in the art. For example, pipe may be cut by milling, plasma cutting, laser cutting, ultra high pressure water cutting, and oxy-acetylene cutting. In addition, one of ordinary skill in the art will appreciate that other methods may be used to make longitudinal cuts through a pipe. In one embodiment, the cutting method may be automated, thereby reducing the risks associated with personnel in contact with radioactive mineral scale. In another embodiment, a cutting tool, for example, a multiheaded tool, may be used to cut several pipes or tubes simultaneously. In another embodiment, the process of cutting pipes and removing pipes from mineral scale may be performed under water, thereby providing greater levels of Health, Safety, and Environmental (HSE) standards.

In one embodiment, mineral scale layer 204, 404, 504 is substantially solid, forming a mineral scale cylinder. Thus, with reference, for example, to FIGS. 1-3, when longitudinal cuts 206 are made through pipe 202, the first and second cut portions 212, 214, and the first and second sides 222, 224 of pipe 202 may be removed from a cylinder of mineral scale. Mineral scale may then be collected, processed disposed of in a safe manner. However, in another embodiment, mineral scale layer 204 may not be substantially solid. In this embodiment, the mineral scale may remain on the inside diameter of pipe 202. Mineral scale may then be removed from pipe 202 after the pipe 202 is cut in the longitudinal direction by other mechanical or chemical means, as described below with reference to residual mineral scale.

In one embodiment, when sections, for example first and second cut portions 212, 214 of FIG. 2, of the cut pipe 202 are removed from mineral scale layer 204, the sections of cut pipe 202 may be uncontaminated. That is, the sections of cut pipe 202 removed from mineral scale layer 204 do not contain any residual mineral scale on the surface of pipe 202. In another embodiment, when sections, for example first and second cut portions 212, 214 of FIG. 2, of cut pipe 202 are removed from mineral scale layer 204, the sections of cut pipe 202 may contain some residual amount of mineral scale on the surface of sections of pipe 202. In this case, the residual amounts of mineral scale may be more easily removed from sections of pipe 202 because of the accessibility to the inside surfaces of each section of pipe 202. Residual mineral scale on the surface of sections of pipe 202 may be removed by physical or chemical means, or a combination of both, known in the art. For example, residual mineral scale may be removed from a section of pipe 202 by milling, high pressure water jetting, sand blasting, cryogenic immersion, and/or chemical chelants and solvents. Once sections of pipe 202 have been inspected to ensure each section is uncontaminated, the sections of pipe 202 may be disposed of.

Advantageously, embodiments disclosed herein may provide a method for removing mineral scale from a pipe or tube in a quick and safe manner. Embodiments disclosed herein may advantageously provide a method for automated removal of mineral scale from pipe that may reduce the health risk of associated personnel. Embodiments disclosed herein may advantageously provide a method for separating mineral scale from multiple pipes or tubes simultaneously. Embodiments disclosed herein may advantageously provide a method for more easily accessing the layer of mineral scale built up on the inside diameter of a pipe. Embodiments disclosed herein may advantageously retain mineral scale intact, thereby reducing radioactive dust or spray during the descaling operation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for removing mineral scale from tubing, the method comprising:
- making a first longitudinal cut along a length of the tubing;
- making a second longitudinal cut along a length of tubing; and
- removing a plurality of sections of tubing, wherein the sections of tubing are defined by the first and second longitudinal cuts,
- wherein the first and second longitudinal cuts are tangential to an inside diameter of the tubing.

2. The method of claim 1, wherein the first longitudinal cut is parallel to the second longitudinal cut.

3. The method of claim 1, wherein first longitudinal cut is perpendicular to the second longitudinal cut.

4. The method of claim 1, wherein the making a first longitudinal cut and making a second longitudinal cut is one selected from the group consisting of plasma cutting, laser cutting, ultra high pressure water cutting, and oxy-acetylene cutting.

5. A method for removing mineral scale from tubing, the method comprising:
- making a first longitudinal cut tangential to an inside diameter of the tubing;
- making a second longitudinal cut tangential to the inside diameter of the tubing; and
- removing a plurality of sections of tubing, wherein the sections of tubing are defined by the first and second longitudinal cuts.

6. The method of claim 5, wherein the first longitudinal cut is parallel to the second longitudinal cut.

7. The method of claim 5, wherein the first longitudinal cut is perpendicular to the second longitudinal cut.

8. The method of claim 5, wherein the making a first longitudinal cut and making a second longitudinal cut is one selected from the group consisting of milling, plasma cutting, laser cutting, ultra high pressure water cutting, and oxy-acetylene cutting.

9. The method of claim 5, further comprising removing residual mineral scale from a surface of at least one of the plurality of sections of tubing.

10. The method of claim 9, wherein the removing residual mineral scales is one selected from the group consisting of milling, high pressure water jetting, sand blasting, cryogenic immersion, chemical chelants, and chemical solvents.

11. A method for removing mineral scale from tubing, the method comprising:
- making at least one cut longitudinally along the tubing; and
- separating cut tubing from the mineral scale,
- wherein the making at least one cut comprises making at least one cut substantially tangential to an inside diameter of the tubing,
- wherein the at least one cut is made along an entire chord of a cross-section of the tubing.

12. The method of claim 11, wherein the making at least one cut comprises making two substantially parallel cuts substantially tangential to an inside diameter of the tubing.

13. The method of claim 11, wherein the making at least one cut is one selected from the group consisting of milling, plasma cutting, laser cutting, ultra high pressure water cutting, and oxy-acetylene cutting.

14. The method of claim 11, further comprising removing residual mineral scale from a surface of at least one of a plurality of sections of tubing.

15. The method of claim 14, wherein the removing residual mineral scales is one selected from the group consisting of milling, high pressure water jetting, sand blasting, cryogenic immersion, chemical chelants, and chemical solvents.

* * * * *